United States Patent [19]

Jeanclaude et al.

[11] Patent Number: 5,737,374
[45] Date of Patent: Apr. 7, 1998

[54] DELAY LOCKED LOOP FOR USE IN A GPS SIGNAL RECEIVER

[75] Inventors: Eric Jeanclaude, Bellevue; Pierre-André Farine, Neuchâtel; Jean-Daniel Etienne, Les Geneveys-sur-Coffrane, all of Switzerland

[73] Assignee: Asulab S.A., Bienne, Switzerland

[21] Appl. No.: 617,638

[22] Filed: Mar. 19, 1996

[30] Foreign Application Priority Data

Apr. 11, 1995 [FR] France ................................ 95 04333

[51] Int. Cl.⁶ ...................................................... H03D 3/24
[52] U.S. Cl. ........................... 375/376; 375/208; 375/373; 342/357; 342/463
[58] Field of Search ........................ 375/200, 205, 375/206, 208, 215, 376, 373, 371, 367, 343; 380/34; 455/12.1, 13.1, 13.2; 342/192, 413, 444, 463, 357

[56] References Cited

U.S. PATENT DOCUMENTS

| 4,809,005 | 2/1989 | Counselman, III | 342/352 |
|---|---|---|---|
| 4,912,722 | 3/1990 | Carlin | 375/200 |
| 5,062,122 | 10/1991 | Pham et al. | 375/200 |
| 5,101,416 | 3/1992 | Fenton et al. | 375/200 |
| 5,365,550 | 11/1994 | Roberson | |
| 5,400,359 | 3/1995 | Hikoso et al. | 375/200 |

FOREIGN PATENT DOCUMENTS

| 445522 | 9/1991 | European Pat. Off. |
|---|---|---|
| 552975 | 7/1993 | European Pat. Off. |

*Primary Examiner*—Stephen Chin
*Assistant Examiner*—Joseph Roundtree
*Attorney, Agent, or Firm*—Sughrue, Mion, Zinn, Macpeak & Seas, PLLC

[57] ABSTRACT

Delay locked loop intended to be used in a receiver of signals emitted by a GPS satellite, comprising a pseudo-random code generator (35), a local oscillator (34), a modulator (14) for modulating said pseudo-random code with the output signal of said local oscillator (34), a plurality of signal channels (C1, C2, C3) connected to the output of said modulator (14) and each comprising a pass-band filter (48 to 50). A data processing unit (11) is adapted to control the central frequency of the output signal of said local oscillator as a function of the output signal of said signal detection circuit and to control the central frequencies and the bandwidth of said pass-band filters (48 to 50) in several steps during said acquisition phase, so that said pass-band filters divide up, at each step, one of the pass-bands of the preceding step into non-overlapping pass-bands.

4 Claims, 4 Drawing Sheets

Fig.3
$f_{LO,1}$ = 1.023 MHz
Step 1
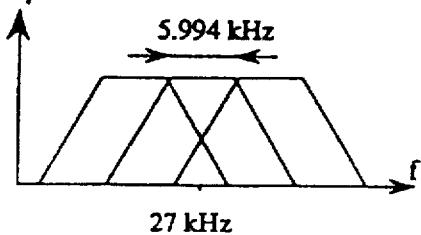
5.994 kHz
27 kHz
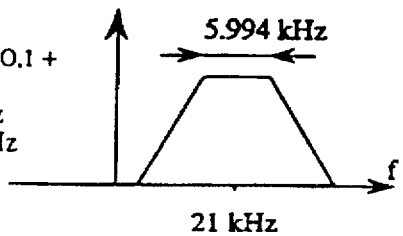
$f_{LO,2}$ = $f_{LO,1}$ +
0 kHz
5.994 kHz
11.998 kHz
5.994 kHz
21 kHz
Step 2
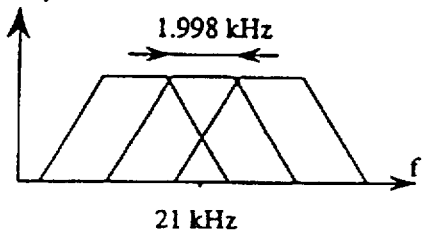
1.998 kHz
21 kHz
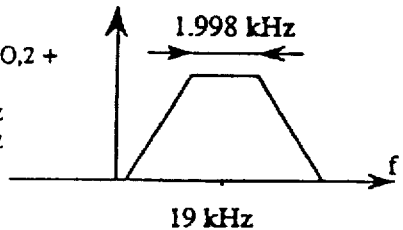
$f_{LO,3}$ = $f_{LO,2}$ +
0 kHz
1.998 kHz
3.996 kHz
1.998 kHz
19 kHz
Step 3
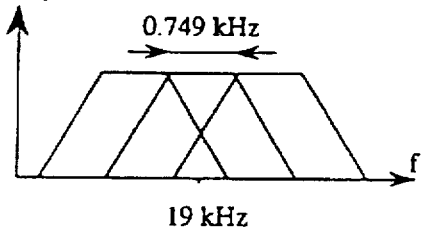
0.749 kHz
19 kHz
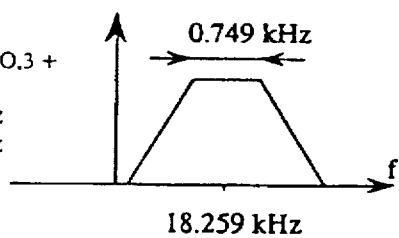
$f_{LO,4}$ = $f_{LO,3}$ +
0 kHz
0.749 kHz
1.498 kHz
0.749 kHz
18.259 kHz
Step 4
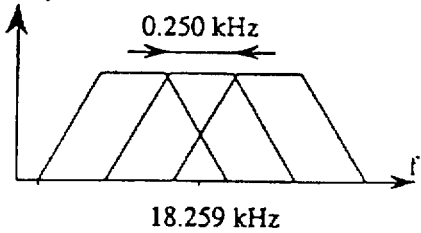
0.250 kHz
18.259 kHz

Fig. 4

| | LO | Filters |
|---|---|---|
| Step 1 | $f_{prn} = f_{LO,1} = 1.023$ MHz | $cf_1 = 27$ kHz<br><br>$BW_1 = \dfrac{f_{prn}}{2^8} + \dfrac{f_{prn}}{2^9}$<br>$= 5.994140625$ kHz |
| Step 2 | $f_{LO,2} = \begin{cases} f_{LO,1} \\ f_{LO,1} + BW_1 \\ f_{LO,1} + 2BW_1 \end{cases}$ | $cf_2 = cf_1 - BW_1$<br>$= 21.0005859375$ kHz<br><br>$BW_2 = \dfrac{f_{prn}}{2^9}$<br>$= 1.998046875$ kHz |
| Step 3 | $f_{LO,3} = \begin{cases} f_{LO,2} \\ f_{LO,2} + BW_2 \\ f_{LO,2} + 2BW_2 \end{cases}$ | $cf_3 = cf_2 - BW_2$<br>$= 19.0078125$ kHz<br><br>$BW_3 = \dfrac{f_{prn}}{2^{11}} + \dfrac{f_{prn}}{2^{12}}$<br>$= 749.267578125$ Hz |
| Step 4 | $f_{LO,4} = \begin{cases} f_{LO,3} \\ f_{LO,3} + BW_3 \\ f_{LO,3} + 2BW_3 \end{cases}$ | $cf_4 = cf_3 - BW_3$<br>$= 18.2585449219$ kHz<br><br>$BW_4 = \dfrac{f_{prn}}{2^{13}}$<br>$= 249.755859375$ Hz |

DELAY LOCKED LOOP FOR USE IN A GPS SIGNAL RECEIVER

BACKGROUND OF THE INVENTION

The present invention concerns delay locked loops intended to be used in radio signal receivers and in particular in receivers of signals emitted by GPS satellites comprising a delay locked loop.

The GPS system, from its real name of NAVSTAR-GPS (acronym which comes from the expression "NAVigation Satellite Time And Ranging Global Positioning System") comes from the United States Defense Department. This system uses a constellation of navigation satellites to transmit GPS signals from which a terrestrial receiver can determine its position, speed and local time with precision. The constellation is comprised of twenty-four satellites spread out at an altitude of 20'183 km in six orbital planes inclined at 55° with respect to the equator. The spreading out of the satellites is chosen to ensure a continuous coverage of twenty-four hours a day everywhere in the world. Each satellite carries at least one atomic frequency standard in order to be able to supply high precision time-keeping information. In addition, each satellite receives, from terrestrial control stations, a signal enabling correction of its time keeping information and of the orbital information.

Each satellite emits simultaneously, by bi-phased shift keying, or BPSK, on two distinct carrier signals, that is to say a signal L1 having a frequency of 1'575.42 MHz and a signal L2 having a frequency of 1'227.6 MHz. The signals L1 and L2 are comprised of the actual information, emitted at a frequency of 50 bits per second, and a satellite identification code, which has a much higher frequency. Two types of codes are used: a code C/A (which comes from the expression (Clear Access), and a code P (which comes from the word Protected).

The code C/A is constituted by 1,023 bits generated at a frequency of 1.023 MHz, which implies a repetition period of 1 ms/s. The use of such a code is justifiable for the following reasons: (i) it is pseudo-random, since it has, during a short term, all the characteristics of white noise; (ii) its cancels out if it is multiplied by itself; and (iii) it enables access to multiple users on the same carrier signal. The C/A code is only found on the L1 carrier signal and it is the code used for civilian applications. The information emitted by the satellite is firstly BPSK modulated with the C/A code, which produces a spectrum spreading from an initial base band width of 50 Hz to 1.023 MHz. The modulation on the L1 carrier is then carried out and the signal thus obtained is transmitted to the receiver.

The signal received by the receiver is characterized principally by its energy above that of the noise. The signal-to-noise ratio is in the order of −20 dB. The inverse operation to the spectrum spreading is effected to the emission, that is to say its compression, which enables the message to be brought to an acceptable energy level. For this it is necessary to multiple the received signal by the pseudo-random code of the corresponding satellite, which eliminates the modulation introduced thereby. The quality of the resultant signal depends on the degree of similarity between the code generated by the receiver and thus emitted by the satellite. This quality unfortunately suffers from imprecisions related to the concept of the system. These imprecisions arise principally from the frequency shifts due to the Doppler effect and the imprecisions of the oscillator forming part of the receiver and of the relative phase shift.

SUMMARY OF THE INVENTION

One aim of the invention is to realise a GPS signal receiver which synchronises the two C/A code respectively of the satellite and of the receiver.

Another aim of the invention is to realise a GPS signal receiver in which the compression of the GPS signal spectrum is made less complex than was the case in the prior art.

Another aim of the invention concerns a GPS signal receiver which is simple, efficient, inexpensive and easy to realise.

The object of the invention is thus a delay locked loop intended to be used in a receiver of a signal emitted by a GPS satellite, said signal including information modulated by a pseudo-random code, said receiver being adapted to search, during an acquisition phase, said GPS satellite to identify said pseudo-random code, comprising:

- a pseudo-random code generator for generating a copy of said pseudo-random code of said satellite;
- a local oscillator;
- a modulator for modulating said copy of said pseudo-random code from said satellite, coming from said generator of pseudo-random codes, with the output signal of said local oscillator;
- a plurality of signal channels each including a correlator connected to the output of said modulator, a pass band filter connected to the output of said correlator and a signal detection circuit connected to the output of said pass-band filter; and
- a data processing unit adapted to control the central frequency of the output signal of said local oscillator as a function of the output signals of said signal detection circuit;

said delay locked loop being characterized in that said data processing unit is adapted to control the central frequencies and the bandwidth of said pass-band filters in a plurality of steps during said acquisition phase so that said pass-band filters divide up, at each step, one of the pass-bands of the preceding step into non-overlapping pass bands.

Due to these characteristics, a GPS signal receiver can be realised in such a way that the pass-band filters of the three channels of the delay locked loop, channels which are necessary in the tracking phase of the GPS signal, are also used in the acquisition phase to identify the pseudo-random code of the GPS satellite.

Other characteristics and advantages of the invention will appear during the description which will now follow, which is provided solely as an example, and made with reference to the annex drawings in which:

BRIEF DESCRIPTION OF THE DRAWINGS

FIG. 3 is a schematic diagram representing the pass-bands of the filters of the three channels of the delay locked loop of FIG. 2 in successive steps of the acquisition phase of the receiver of FIG. 1; and FIG. 4 is a table presenting the calculations effected by the data processing unit of the receiver of FIG. 1 in order to arrive at the values of the output signal frequency of the local oscillator, of the central frequency and of the bandwidth of the pass-band filters of the receiver.

DESCRIPTION OF PREFERRED EMBODIMENTS

Figure 1:
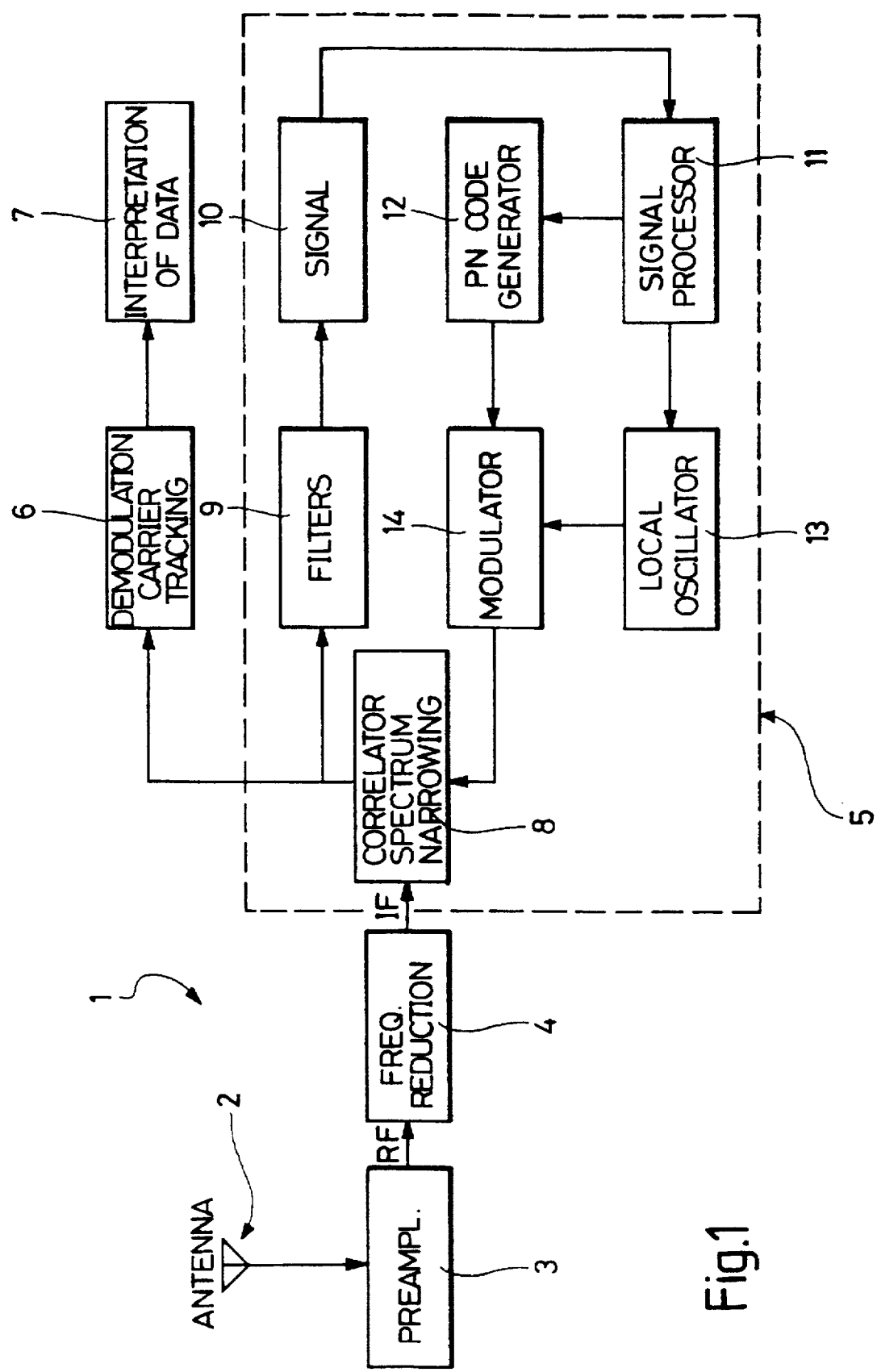
FIG. 1 is a schematic diagram of a GPS signal receiver including a delay locked loop according to the invention.

Referring at FIG. 1, there is represented in schematic diagram form a GPS receiver 1 according to the invention.

The receiver 1 comprises an antenna 2 able to detect GPS signals, a preamplifier 3 connected to the antenna 2 and a frequency reduction circuit 4 which, in a well-known manner, brings the radio frequency of the GPS signal to an intermediate frequency. A feedback loop 5 is connected to the output of the frequency reduction circuit 4 and serves, firstly, to find and, to track a satellite by identification of its pseudo-random code. These two phases of operation are respectively called the acquisition phase and the tracking phase. After the acquisition and during the tracking of the pseudo-random code, a demodulation and tracking circuit 6 carries out conjointly a demodulation of the carrier signal brought to the intermediate frequency mentioned above and the tracking of this carrier signal. The demodulation carried out by the circuit 6 enables the recovery of the information emitted by the GPS satellite, the interpretation being made by the data interpretation circuit 7.

The feedback loop 5 is constituted by a delay locked loop. This latter effectuates a correlation between the pseudo-random code generated by the receiver and the signal received from the GPS satellite in question. It results therefrom a signal which no longer appears to be white noise when the two pseudo-random codes are identical. The detection and the tracking of such a signal constitutes the function of this delay locked loop. The delay locked loop 5 comprises a correlation circuit 8, a filter circuit 9, a signal detection circuit 10, a digital data processing unit 11, a pseudo-random code generator circuit 12, a local oscillator circuit 13 and a modulator 14.

The operation of the delay locked loop 5 will now be explained by referring to FIG. 2 which represents a schematic diagram of one embodiment thereof. The signal received at the input of the delay locked loop 5 is comprised of the carrier signal frequency $f_{IF1}$ modulated by the C/A delay locked of one of the GPS satellites and by the GPS navigation message information. A signal limiter 30 and a high speed switch S1 carry out the analog to digital conversion of the signal received on one bit. Since the bandwidth LB of the received signal at the input of the limiter 30 is approximately 2.046 MHz, the intermediate frequency $f_{IF1}$ must be greater than the sum of half this value plus the value of the frequency shifts Δf mentioned above if signal spectrum folding is to be avoided. In the code loop 5 shown in FIG. 2, a nominal value of $f_{IF1}$ equal to 1.050 MHz is used. According to Shannon theory, the sampling frequency $f_{s1}$ must be at least $$2 \times \left( \frac{LB}{2} + \Delta f \right) \text{ MHz}.$$

As will be seen later, a binary value which corresponds to 1.023 MHz is available in the data processing unit 11 (this value corresponding to the generation frequency of the local code in the receipter 1). It is thus convenient to use this value to calculate the value of the sampling frequency $f_{s1}$. For example, a value $f_{s1}=4f_{prn}+f_{prn}/2^3=4.220$ MHz can be used.

After sampling, the received signal is filtered by a pass-band filter 31 to keep only the first repetition of the spectrum centred on 0 Hz. The pass-band filter is preferably a digital filter having an order of 2 or more.

The circuit 13 comprises a signal limiter 31, a high speed switch S2, a low pass filter 33 and a local oscillator 34. The local oscillator 34 produces a signal whose frequency $f_{LO}$ is controlled by a control signal coming from the data processing unit 11. The signal limiter 32 controls the amplitude of the signal generated by the local oscillator 34. This signal is sampled at the frequency $f_{s1}$ by the high speed switch which is controlled by the data processing unit 11. Thus, the signal limiter 32 and the high speed commutator S2 (as well as the signal limiter 30 and the high speed switch S1) form an analog/digital converter. Next, the signal is filtered by the pass-band filter 33 so as to keep only the first repetition of the spectrum centred on 0 MHz. The pass-band filter 33 is also preferably a digital filter having an order of 2 or more.

The circuit 12 comprises a pseudo-random code generator 35, a high speed switch S3 and a pass-band filter 36. The pseudo-random code generator generates a code of 1,023 bits which is identical to the C/A code emitted by one of the GPS satellite. The exact code generated, and by consequence the satellite sought and tracked by the receiver 1, is determined by a control signal coming from the data processing limit 11. The pseudo-random code produced by the receipter will be called in the following the "local code". The bits which constitute the local code are generated at a frequency of 1.023 MHz (controlled by clock pulses supplied by the data processing unit 11), which corresponds to the nominal frequency of the C/A code emitted by the sought GPS satellite. The local code is sampled at a frequency $f_{s1}$ by a high speed S3 which is controlled by the data processing unit 11. Next, the sampled signal is filtered by the pass-band filter 36. The pass-band filter 36 is also preferably a digital filter having an order of 2 or more.

Figure 2:
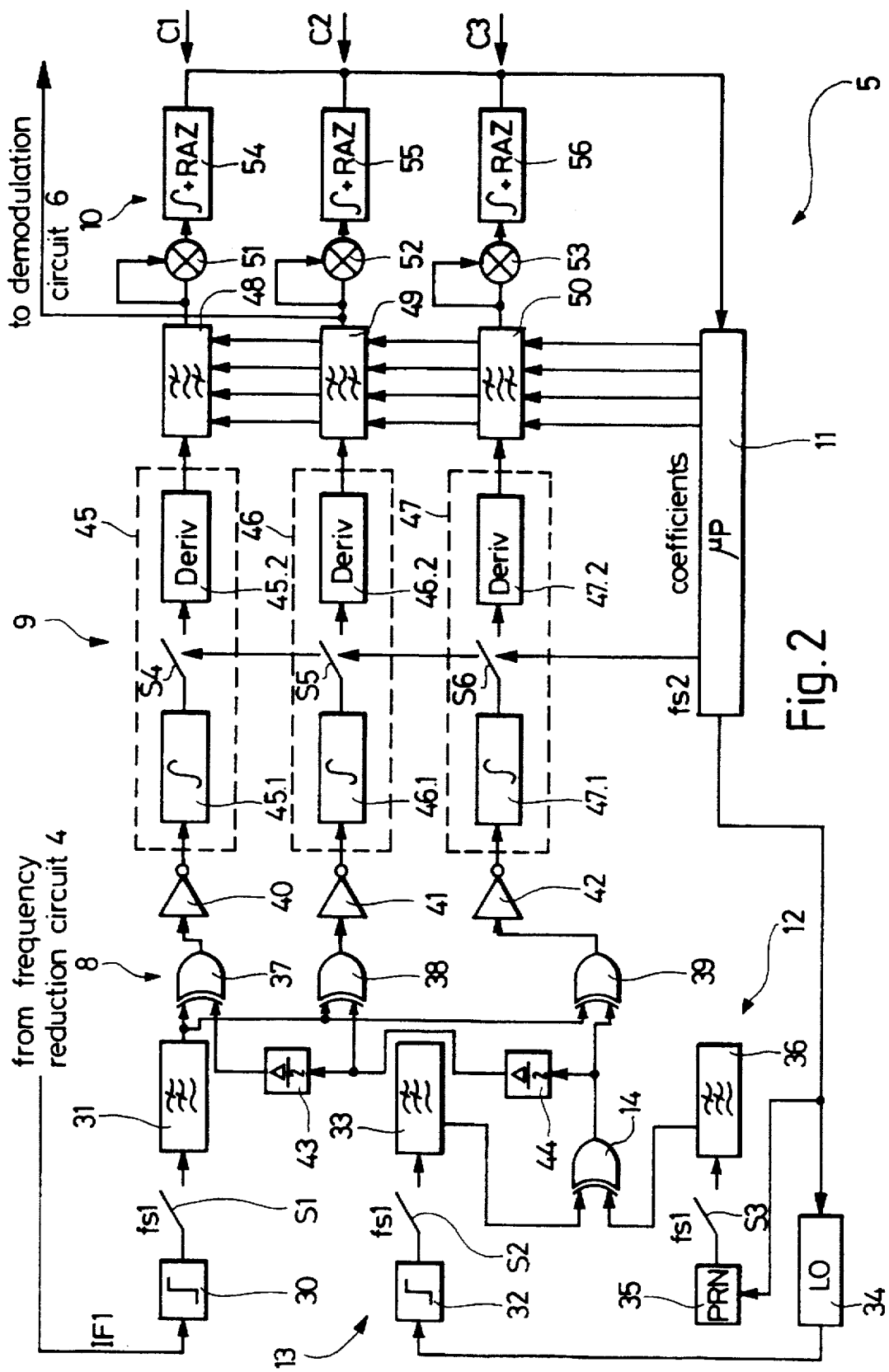
FIG. 2 a schematic diagram of a digital delay locked loop which forms part of the GPS signal receiver of FIG. 1.

In the delay locked loop 5 of FIG. 2, the modulator 14 represented in FIG. 2 is realised by an EXCLUSIVE-OR gate. The output signals of the pass-band filters 33 and 36 are respectively applied to the two inputs of the EXCLUSIVE-OR gate 14. The output signal of the EXCLUSIVE-OR gate 14 is by consequence a signal having the spectrum of the local code transposed to a central frequency $f_{LO}$.

In another embodiment (not shown), the output signals of the local oscillator 34 and of the pseudo-random code generator 35 may be directly applied to the two inputs of the exclusive or gate 14. In this case, the output signal of the EXCLUSIVE-OR gate 14 can be sampled at the frequency $f_{s1}$ by a high speed switch, of the same type as that of the switches S2 and S3. Next, this signal may be filtered by a pass-band filter, of the same type of that of pass-band filters 33 and 36. Advantageously, this arrangement requires less components than the delay locked loop 5 shown in FIG. 2.

The correlation circuit 8 comprises three EXCLUSIVE-OR gates 37, 38 and 39, whose outputs are respectively connected to the input of three INVERTER gates 40, 41 and 42, and two delay circuits 43 and 44. The output of the pass-band filter 31 is connected to one of the inputs of the EXCLUSIVE-OR gates 37, 38 and 39. The output of the EXCLUSIVE-OR gate 14 is connected to the other input of the EXCLUSIVE-OR gates 37, 38 and 39. However, the delay circuits 43 and 44 introduce a delay of Δ/2 between the input signals of the EXCLUSIVE-OR gates 37 and 38 and between the signals at the inputs of the EXCLUSIVE-OR gates 38 and 39. In this case, Δ corresponds to the duration of one bit of code (a bit of code being called a "chip"). The delay circuits 43 and 44 are necessary in the tracking phase of the receiver 1 and its operation will be explained in this regard further on. The INVERTER gates 40, 41 and 42 invert the logical state of the output signal respectively of the EXCLUSIVE-OR gates 37, 38 and 39. Thus, when the two bits at the inputs of the EXCLUSIVE-OR gates 37, 38 and 39 have the same logical state, that is to say there is a correlation between them, the output signal of the INVERTER gates 40, 41 and 42 have a logically high state and when the two bits at the inputs of the EXCLUSIVE-OR gate 37, 38 and 39 do not have the same logical state, that is to say they are not correlated, the output signals of the INVERTER gates 40, 41 and 42 have a logical low state.

The fact that the output signals of the EXCLUSIVE-OR gate 14 and the limiter 30 are effectively sampled at the same frequency enables the use of EXCLUSIVE-OR gate 37, 38 and 39 in the delay locked loop 5, instead of multiplicators, to combine the signal together. Similarly, the fact that the output signal of the pseudo-random code generator has the same frequency enables the use of the EXCLUSIVE-OR gate 14, instead of a multiplier, to combine the signal together. This represents a clear simplification of the realisation of the GPS receiver.

The above-described correlation brings the signal spectrum from an additional bandwidth of approximately 2 MHz to that of the information signal, approximately 100 Hz. This operation does not provide a signal which is directly utilisable. Filtering is necessary to eliminate the undesirable components which are found outside of the compressed spectrum. The filtering circuit 9 comprises the all-pass filters 45, 46 and 47, connected respectively to the outputs of INVERTER gates 40, 41 and 42, and to pass-band filters 48, 49 and 50 connected respectively to the outputs of the all-pass filters 45, 46 and 47.

The all-pass filters 45, 46 and 47 are respectively constituted by the combinaison of an integrator 45.1, a high speed switch S4 and a derivator 45.2, the combination of an integrator 46.2, a high speed switch S5 and a derivator 46.2 and a combinaison of an integrator 47.1, a high speed switch S6 and a derivator 47.2.

The transfer function of the filters 45, 46 and 47 is of the all-pass type, but the interruption of the high speed switches S4, S5 and S6, respectively between the integrator 45.1 and the derivator 45.2, between the integrator 46.1 and the derivator 46.2, between the integrator 47.1 and the derivator 47.2 enables an under-sampling of the signal present at the input of the filters 45, 46 and 47.

Next, the filters 48, 49 and 50 realise the desired passband transfer function on the low sampling frequency signals coming respectively from the output of the combined filters 45, 46 and 47. The pass-band filters 48, 49 and 50 are preferably digital filters having an order of 4 or more. The under-sampling provides the following advantages: (i) a reduction of the necessary sensitivity of the pass-band filters 48, 49 and 50, and (ii) a reduction of the energy consumption of the delay locked loop 5.

The signals obtained at the output of the pass-band filters 48, 49 and 50 are constituted by a carrier signal phase modulated (BPSK) by the information (emitted at a frequency of 50 Hz) of the GPS message and amplitude modulated by the correlation function of the local code and the C/A code emitted by the GPS satellite in question. These signals are applied to the inputs of the signal detection circuit 10. The latter comprises three multipliers 51, 52 and 53 respectively connected to three integration and reset to zero circuits 54, 55 and 56. The multipliers 51, 52 and 53 are each adapted to create an output signal which is the square of its output signal.

The squaring by the mulitpliers 51, 52 and 53 indicates the power of the signals obtained after filtering by the pass-band filters 48, 49 and 50 and the integration by the circuit 54, 55 and 56 enables the measurement of the energy thereof. The values thus obtained being proportional to the amplitude of the output signal of the pass-band filters 48, 49 and 50, indicate the quality of the correlation of the local code and the C/A code emitted by the GPS satellite.

The digital values coming from the output of the integration and reset to zero circuits 54, 55 and 56 are all stored in the data processing circuit 11 for processing thereby. Next, the values in the integration and reset to zero circuits 54, 55 and 56 are reset to zero.

It will be noted that the receiver 1 comprises three signal channels C1, C2 and C3 which are quasi-identical, that is to say (i) a first channel C1 defined by the EXCLUSIVE-OR gate 37, the INVERTER gate 40, the all-pass filter 45, the pass-band filter 48, the multiplier 51 and the integration and reset-to-zero circuit 54, (ii) a second channel C2 defined by the EXCLUSIVE-OR gate 38, the INVERTER port 41, the all-pass filter 46, the pass-band filter 49, the multiplier 52 and the integration and reset-to-zero circuit 55 and (iii) a third channel C3 defined by the port EXCLUSIVE-OR gate 39, the INVERTER port 42, the all-pass filter 47, the pass-band filter 50, the multiplier 53 and the integration and reset-to-zero circuit 56. The signals present in these three channels are identical, but out of phase by $\Delta/2$ with respect to each other.

The operation of the receiver 1 during the acquisition phase and during the tracking phase will now be described.

The acquisition phase consist essentially of effectuating a search for a visible GPS satellite for the receiver 1 by identifying of its C/A code. The acquisition consists of correlating the local code generated by the receiver 1 with the signal received by the GPS satellite. It is necessary, in order that the correlation can take place, to correct the errors which disrupt the similarity of the two pseudo-random codes. Two distinct approaches can be used to realize the acquisition, that is to say either a sequential acquisition, or an acquisition by frequency shifting. The receiver 1 uses these firstof these two approaches.

During the sequential acquisition phase of the receiver 1, a correlation is sought between all the possible phases of the local code generated by the receiver 1 at a fixed frequency, that is to say the frequency $f_{LO}$, with the signal received from the thought satellite. In order to do this, the digital data processing unit 11 controls the pseudo-random code generator 12 so that this latter generates, one after the other, several groups of 1023 bits which constitute the C/A code emitted by the satellite. During the emission of each group, the digital data processing unit 11 eliminates one of the clock pulses supplied to the pseudo-random code generator (a group being the complete cycle of 1023 bits constituting the C/A code). Each complete cycle of local code generated by the receiver 1 is thus out of phase with respect to the preceding cycle. Thus, a "slipping" of phase is established between the C/A code emitted by the satellite and the local code generated by the receiver 1.

At the start of the acquisition phase, the local oscillator 34 is controlled so that it supplies an output signal having a frequency $f_{LO}$ of 1.023 MHz. Consequently, the output signal of the exclusive or gate 14 is centred on a nominal frequency of 1.023 MHz with a bandwidth in the order of 2 MHz. The correlation effectuated by the correlation circuit 8 reduces the nominal central frequency to a value of (1.050–1.023) MHz=27 kHz.

To detect that the synchronisation between the C/A code emitted by the satellite and the local code generated by the receiver 1 during this code "slipping", it is necessary to be able to observe a difference between a correlated signal and a non-correlated signal with the local code. If it was known with precision what was the intermediate frequency $f_{IF1}$ and the frequency of the signal generated by the local oscillator 34, one could use a pass-band filter of 100 Hz centred on a value of 27 kHz and connected to one of the outputs of the correlation circuit 8 to detect the synchronisation. However, the information sought could be found in a range of frequencies whose limits will depend on the variation of the frequency due to the Doppler effect and to the frequency error of the oscillator with respect to its ideal value. The position of the GPS satellite with respect to a stationary user implies, for the first of its effects, a reference value in order of ±4 kHz. The imprecisions of the local oscillator depend strongly upon its type and upon its technology used. Generally, it may be estimated that the maximum error is of the same order of magnitude as that produced by the Doppler effect.

In order to compensate these effects, the three pass-band filters 48, 49 and 50 of three channels C1, C2 and C3 of the delay locked loop 5 (filters which are necessary in the tracking phase, as will be seen later one), are used in successive steps, this being three times more accurate at each step. FIG. 3 shows the pass-band of the filters of the three channels C1, C2 and C3 of the delay locked loop 5 in successive steps of the acquisition phase of the receiver 1. At the start of the acquisition phase (step 1), the data processing unit 11 controls the coefficients of the pass-band filters 48, 49 and 50 so that each one has a pass-band of 5.994 kHz and that these pass-bands are centred respectively on the frequencies of 21 kHz, 27 kHz and 33 kHz. The value of 5.994 kHz was chosen since it is equal to $$\frac{f_{pm}}{2^8} + \frac{f_{pm}}{2^9}$$

and consequently can be easily calculated by the data processing unit 11. The calculations, carried out by the data processing unit 11, of the values of the frequency of the output signal of the local oscillator 34, of the central frequency and of the bandwidth of the pass band filters 48, 49 and 50 at each step of the acquisition phase of the receiver 1 are indicated in FIG. 4.

The pass-band filters, in this step, form a combined pass-band filter with a bandwidth in the order of 18 kHz and with a central frequency of 27 kHz. This bandwidth was chosen so that it is at least as large as the frequency shifts which affect the receiver and the receipt signal.

When the local code of the receiver 1 is correlated with the C/A code of the signal emitted by the satellite, the energy level of the signal thus demodulated is found to be brought into its original spectral width with a signal to noise ratio which enables the detection of this demodulation. The other elements forming part of the signal transmitted by the GPS satellite remains tight n the entire spectrum, thus with a weak power in the band which concerns this application. It is thus possible, due to the filtering carried out by the three pass-band filters 48, 49 and 50, to detect in which part of the band of the combined filter is to be found in the demodulated signal.

To more accurately determine the frequency of the demodulated signal, the bandwidth of the pass-band filters 48, 49 and 50, in which the presence of the demodulated signal has been detected, is divided (step 2) amongst the three pass-band filters 48, 49 and 50. A suitable value of $$\frac{f_{pm}}{2^9} = 1.998 \text{ kHz}$$

may be used for this bandwidth. The frequency $f_{LO,2}$ of the output signal of the local oscillator 34, in step 2, is controlled so that it is equal (i) to the frequency $f_{LO,1}$ of the local oscillator in step 1 in the case where the demodulated signal is detected in the bandwidth of the pass-band filter centred on 21 kHz, (ii) to the frequency $f_{LO,1}$ of the local oscillator in step 1 greater than the bandwidth BW1 of the pass-band filters in the step in a case where the demodulated signal is detected in the bandwidth of the pass-band filters centred on 27 kHz, or (iii) to the frequency $f_{LO,1}$ of the local oscillator in step 1 plus twice the bandwidth BW1 of the pass-band filters in this step in the case where the demodulator signal is detected in the bandwidth of the pass-band filters centred on 33 kHz. Thus, the central frequency of the demodulated signal in step 1 is brought in step 2 into the bandwidth of the pass-band filter centred on the lowest frequency (21.00 kHz in step 1).

To determine even more accurately the frequency of the demodulated signal, the bandwidth of the pass-band filter 48, 49, and 50 in which the presence of the demodulated signal has been detected in step 2 is again divided amongst three past-band filters 48, 49 and 50 in step 3. A suitable value of $$\frac{f_{pm}}{2^{11}} + \frac{f_{pm}}{2^{12}} = 749.268 \text{ Hz}$$

may be used for this bandwidth. The frequency $f_{LO,3}$ of the output signal of the local oscillator 34, in step 3, is regulated so that it is equal (i) to the frequency $f_{LO,2}$ of the local oscillator in step 2 in the case where the demodulator signal is detected in the bandwidth of the pass-band filter centred on 19.02 kHz, (ii) to the frequency $f_{LO,2}$ of the local oscillator in step 2 plus the bandwidth BW2 of the pass-band filters in this step in the case where the demodulator signal is detected in the bandwidth of the pass-band filter centred on 21.00 kHz, or (iii) to the frequency $f_{LO,2}$ of the local oscillator in step to plus twice the bandwidth BW2 of the pass-band filters in this step in a case where the demodulated signal is detected in the bandwidth of the pass-band filter centred on 22.998 kHz. Thus, the central frequency of the demodulated signal in step 2 is brought in step 3 into the bandwidth of the pass-band filter centred on the lowest frequency (19.007 kHz in step 3).

Finally, the bandwidth of the pass-band filter 48, 49 and 50 in which the presence of the demodulated signal is detected in step 3 is again divided amongst the three pass-band filters 48, 49 and 50 in step 4. A suitable value of $$\frac{f_{pm}}{2^{13}} = 249,756 \text{ Hz}$$

may be used for this bandwidth. The frequency $f_{LO,4}$ of the output signal of the local oscillator 34, in step 4, is controlled that it is equal (i) to the frequency $f_{LO,3}$ of the local oscillator in step 3 in the case where the demodulator is detected in the bandwidth of the pass-band filter centred on 18.259 kHz, (ii) to the frequency $f_{LO,3}$ of the local oscillator in step 3 plus the bandwidth BW3 of the pass-band filters in this step in the case where the demodulator signal is detected in the bandwidth of the pass-band filter centred on 19.008 kHz, or (iii) to the frequency $f_{LO,3}$ of the local oscillator in step 3 plus twice the bandwidth BW3 of the pass-band filters in this step in the case where the demodulator signal is detected in the bandwidth in the pass-band filter centred on 19.757 kHz. Thus, the central frequency of the demodulated signal in step 3 is brought in step 4 into the bandwidth of the pass-band filter centred on the lowest frequency (18.259 kHz in step 4).

As can be seen in FIG. 4, bringing the central frequency of the detected signal in each step into the bandwidth of the pass-band filter centred on "same" frequency (either the lowest frequency, or the highest frequency, or the middle frequency of the three central frequencies of the three pass-band filters 48, 49 and 50) in the following step enables a clear simplification of the calculation of the coefficients transmitted to these filters by the data processing unit 11, as well as a reduction in the quantity of data which must be stored by this latter to effect this calculation.

It can thus be seen that during the acquisition phase of the receiver, the data processing unit controls the central frequencies and the bandwidths of the pass-band filters in several steps so that the pass-band filters divide up, in each step, one of the pass-band of the preceding step into non-overlapping pass-bands.

The particular acquisition process which has just been described, that is to say a process in four successive steps using three pass-band filters of the delay locked loop 5 in a manner which is three times more accurate in each step, enables the detection of the GPS signal emitted by the satellite with an error or ±125 Hz. Such as error margin enables the demodulation and tracking circuit 6 to be able to effectuate conjointly a demodulation of the carrier signal, bringing the central frequency of the correlated signal, and the tracking of this carrier signal.

It should be noted that the number of successive steps, the bandwidth of the pass-band filters and the central frequencies of the pass-band filters of each step are dependant upon the frequencies to which the receiver is submitted and to the precision with which the central frequency of the correlated signal must be known. The embodiment described above is presenting solely as an example.

There will now be resumed what has been obtained in the acquisition phase. The local code of the receiver 1 and the C/A code of the GPS satellite are synchronised by have a phase difference of between $\pm\Delta/2$. The frequency of the output signal of the local oscillator 34 has been modifies in four successive steps so as to have the central frequency of the correlated signal falling in the bandwidth of one of the pass-band filters 48, 49 or 50.

Due to the low circuits 43 and 44, the advanced and delayed versions of the C/A code incorporating a delay of a half a bit, are respectively provided to an input of the exclusive or gate 39 of channel C3 and to an input of the exclusive or gate 37 or channel C1. These versions of the local code are placed in correlation with the C/A code emitted by the satellite. The amplitude of the signal after correlation is a function of the phase difference between the two codes. The fact of using the difference of the square of the amplitude of the carrier signal obtained with the local codes, phase shifted respectively by $\pm\Delta/2$, as a consequence that the control of the oscillator 34, driving the pseudo-random code generator 35, is linearly dependant on the phase shift.

When the difference between the square of the output signal of the pass-band filters 48 of channel C1 ("advanced") and the square of the output signal of the pass-band filter 50 of channel C3 ("delayed") is zero, the C/A code of the thought satellite and that of the receiver 1 are synchronised with zero phase difference for the channel C2 ("in time"). From then on, the tracking of the C/A code of the satellite is assured as long as a parasite or the disappearance from view of the satellite does not cause the unlocking of the delay lock loop. The signal obtained at the output of the pass-band filter 49 is used in the tracking phase to enable the extraction of the GPS navigation message.

Many modifications may be made by the receiver according to the invention, various embodiments of which has just been described, without leaving the domaine of the invention.

Thus, for example, whilst the acquisition phase in the embodiment to the invention described above has been carried out by using the sequential acquisition method, it is also possible to use the method of acquisition at a shifted frequency. In this case, the local code of the receiver is generated at a frequency which is intentionally fixed so as to be shifted from those possible for the received signal (all disturbances included). The duration of a bit of code generated will thus be different from that received, which will cause the phenomena of slipping of the codes with respect to each other. It is thus possible to test all the phases relative to the two codes without requiring the data processing unit 11 to eliminate one clock pulse during each emission of the local code.

It is also possible to inhibit the effect of the delay circuit during the acquisition phase of the receiver 1.

During the tracking phase, three channels C1, C2 and C3 which are parallel and outer phased and needed to obtain the tracking function by subtraction of the advanced and delayed signal (explained above). In the acquisition phase, this substation is not needed and the three channels C1, C2 and C3 supply each its own result. Thus, the dephase shift due to the delay circuit 43 and 44 is not required. It there is nevertheless maintained, the data processing unit 11 must, at the end of the acquisition phase, synchronise the local code with the C/A code received from the GPS satellite by taking into account this dephase shift. This complication can be avoided by carrying out the acquisition on the three channels C1, C2 and C3 in phase if one applies, for example, a short-circuit across each of the delay circuit 43 and 44 during the phase acquisition.

However, it is also possible to benefit from the present delay circuits 43 and 44 during the acquisition phase of the receiver 1. As has been described above, during the phase acquisition of the receiver 1, several groups of 1023 bits are generated one after the other by the pseudo-random code generator 12. To seek a correlation between the local code and the C/A code emitted by the GSP satellite, each complete cycle of the local code generated is dephased with respect to the preceding cycle. During this slipping of phase, the pass-band filters 48, 49 and 50 remain centred on the frequencies and have pass-bands defined for each step (see FIG. 4). If no correlation has been detected in the three channels C1, C2 and C3 during a generation of a complete cycle local code, one seeks a correlation in one of the three channels C1, C2 and C3 during the generation of a complete code cycle which is dephased shift with respect to the preceding code, until all the phases of code have been generated.

Now, the delay circuit 43 and 44 introduce a phase shift between the three channels C1, C2 and C3. It is possible to use this phase shift to improve the speed of slipping of phase between the C/A code emitted by the GPS satellite and the local code generated by the receiver 1. For example, during each step of the phase acquisition, the pass-band filters 48, 49 and 50, may be, firstly, all centred on one of three central frequencies in the pass-band shown in FIG. 3. In this case, a correlation between a local code and the C/A code emitted by the satellite is thought in the three channels C1, C2 and C3, these channels covering the same pass-band, but having a dephase of code different. Then, the pass-band filters 48, 49 and 50, may be, secondly, all centred on a second of the three central frequencies of the pass-bands of a step indicated in FIG. 3 and, again, a correlation thought between the two codes.

Finally, thirdly, the pass-band filters 48, 49 and 50 may be all centred on the third central frequency of the pass-band of this step, again, a correlation thought between the two codes.

If a correlation is not detected, one starts the procedure again, as described above, with a complete cycle of local code generated by the pseudo-random code generator 35.

this code cycle being phase shifted with respect to the preceding code cycle. However, thanks to the phase shift due to the delay circuit 43 and 44, a slipping of the three greatest phases may be effectuated by the pseudo-random code generator 35. This enables a more rapid correlation of the C/A code emitted by the GPS satellite and of the local code during each step of the acquisition phase of the receiver 1.

What is claimed is:

1. Delay locked loop intended to be used in a receiver of signals emitted by a GPS satellite, said signal including information modulated by a pseudo-random code, said receiver being adapted so as to search, during an acquisition phase, said GPS satellite to identify said pseudo-random code, comprising a pseudo-random code generator (35) for generating a copy of said pseudo-random code of said satellite;

a local oscillator (34);

a modulator (14) for modulating said copy of the pseudo-random code of said satellite coming from said pseudo-random generator (35) with the output signal of said local oscillator (34);

a plurality of signal channels (C1, C2, C3) each including a correlator (37 to 42) connected to the output of said modulator (14), a pass-band filter (48 to 50) connected to the output of said correlator and a signal detection circuit (51 to 56) connected to the output of said pass-band filter; and a data processing unit (11) adapted, firstly, to control the central frequency of the output signal of said local oscillator as a function of the output signal of said signal detection circuit and, secondly, adapted to control the central frequencies and the bandwidth of said pass-band filters (48 to 50) in several steps during said acquisition phase, so that said pass-band filters divide up, at each step, one of the pass-bands of the preceding step into non-overlapping pass-bands.

2. Delay locked loop according to claim 1, wherein said data processing unit (11) is adapted to bring the central frequency of the signal detected by the detection circuit (51 to 56) of one of the plurality of signal channels (C1, C2, C3), in each step, in the bandwidth in the same pass-band filter (48, 49 or 50).

3. Delay locked loop according to either claim 1, wherein it further comprises a plurality of all-pass filters (45 to 47) connected respectively between said correlator (37 to 42) and said pass-band filter (48 to 50) of said plurality of signal channels (C1, C2, C3), each one of said all-pass filters (45 to 47) comprising an integrator (45.1, 46.1, 47.1) connected to a derivator (45.2, 46.2, 47.2) by means of a switch (S4–S6), said switches (S4–S6) being controlled by said data processing unit (11) to under-sample the signal supplied to the input of said all-pass filters (45 to 47).

4. The delay locked loop according to claim 2, further comprising a plurality of all-pass filters (45 to 47) connected respectively between said correlator (37 to 42) and said pass-band filter (48 to 50) of said plurality of signal channels (C1, C2, C3), each one of said all-pass filters (45 to 47) comprising an integrator (45.1, 46.1, 47.1) connected to a derivator (45.2, 46.2, 47.2) by means of a switch (S4–S6), said switches (S4–S6) being controlled by said data processing unit 11 to under-sample the signal supplied to the input of said all-pass filters (45 to 47).

* * * * *